United States Patent [19]
Kokotovic

[11] Patent Number: 6,053,510
[45] Date of Patent: Apr. 25, 2000

[54] VEHICLE ACTIVE TILT CONTROL SYSTEM WITH IMPROVED ACTUATORS

[75] Inventor: Vladimir V. Kokotovic, Bloomfield Hills, Mich.

[73] Assignee: Ford Motor Company, Dearborn, Mich.

[21] Appl. No.: 09/018,163

[22] Filed: Feb. 3, 1998

[51] Int. Cl.[7] ................................................ B62B 5/02
[52] U.S. Cl. ................................. 280/5.508; 280/5.5
[58] Field of Search ........................... 280/5.5, 5.508, 280/5.506, 5.509, 5.511; 267/64.11; 188/322.14, 322.15

[56] References Cited

U.S. PATENT DOCUMENTS

| | | | |
|---|---|---|---|
| 3,186,730 | 6/1965 | Angell | 280/104 |
| 4,333,668 | 6/1982 | Hendrickson et al. | 280/703 |
| 4,655,440 | 4/1987 | Eckert | 267/64.11 |
| 4,720,085 | 1/1988 | Shinfori et al. | 267/64.16 |
| 4,723,640 | 2/1988 | Beck | 188/319 |
| 4,743,046 | 5/1988 | Schnittger | 280/707 |
| 4,773,671 | 9/1988 | Inagaki | 280/707 |
| 4,838,392 | 6/1989 | Miler et al. | 188/287 |
| 4,867,475 | 9/1989 | Groves | 280/707 |
| 4,880,086 | 11/1989 | Knecht et al. | 188/299 |
| 4,973,854 | 11/1990 | Hummel | 267/64.26 |
| 5,087,068 | 2/1992 | Fukanaga et al. | 280/707 |
| 5,219,181 | 6/1993 | Lund | 280/772 |
| 5,431,431 | 7/1995 | Fulks et al. | 280/721 |
| 5,558,190 | 9/1996 | Chang | 188/312 |
| 5,735,540 | 4/1998 | Schiffler | 280/689 |

*Primary Examiner*—Lanna Mai
*Assistant Examiner*—Kevin McKinley
*Attorney, Agent, or Firm*—Gregory P. Brown; Roger L. May

[57] ABSTRACT

A vehicle active tilt control system torsionally adjusts front and rear stabilizer bars during vehicle maneuvers. A source of pressurized fluid is provided in communication with a directional control valve. Front and rear actuators each have opposing fluid chambers for receiving fluid from the directional control valve to cause actuator movement for adjusting the front and rear stabilizer bars. Each opposing fluid chamber of the rear actuator includes an inlet with a calibrated orifice therein for restricting flow therethrough to slow movement of the rear actuator for optimal timing of rear actuator movement with respect to front actuator movement. Preferably, the actuator includes a moveable piston with first and second plugs extending therefrom for cooperation within first and second outlets, respectively, in opposing fluid chambers of the actuator to at least partially restrict the fluid flow through the outlets as the pistons approach the fully stroked positions, thereby cushioning piston movement near the end stops.

5 Claims, 5 Drawing Sheets

VEHICLE ACTIVE TILT CONTROL SYSTEM WITH IMPROVED ACTUATORS

TECHNICAL FIELD

The present invention relates to a vehicle active tilt control system with improved actuators and, more particularly, to an active tilt control system with actuators having calibrated orifices and cushioning plugs.

BACKGROUND OF THE INVENTION

Automotive vehicles having independent suspensions are generally equipped with stabilizer bars to reduced inclination or roll of the vehicle bodies during vehicle maneuvers. The stabilizer bar is usually connected between the suspension arms of the vehicle wheels. When the left and right wheels are in similar positions with respect to the suspensions, the stabilizer bar does not twist so that the suspensions are mutually independent. When one of the left wheel and the right wheel passes over a bump on the road surface, or when the vehicle turns and, thus the left wheel and the right wheel assume considerably different positions with respect to the suspensions, the stabilizer bar is twisted. This twisting motion induces a torsional resilient force for affecting the handling and ride performance characteristics of the vehicle wheels.

It is desirable that the torsional resilient force of the stabilizer bars can be adjusted in accordance with ride and handling conditions of the vehicle. Specifically, it is desirable to reduce the torsional rigidity during straight travel of the vehicle and to increase the torsional rigidity during turning of the vehicle. The reduced torsional rigidity enhances the ride and handling characteristics of the vehicle wheels while the increased torsional rigidity enhances the handling and ride characteristics of the vehicle.

Certain vehicle active tilt control systems include front and rear stabilizer bars which are adjustable by front and rear hydraulic actuators placed in lieu of the stabilizer bar linkages. The actuators are movable in first and second opposing directions for adjusting vehicle body active roll movement to compensate for vehicle roll.

The smoothness of the actuator motion is very important for a comfortable ride. Smooth motion is a motion without discontinuities in actuator projectories. "Monotonic" motion is defined as a change in the velocity vector angle in only a single direction. In other words, as an actuator is moving in a certain direction to torque the stabilizer bar, the velocity gradient of the actuator should not change directions.

When the velocity vector angle only decreases during the actuator motion, the motion is considered high quality motion. On the other hand, motion in which the velocity vector angle is both decreasing and increasing during a directional movement, the motion is considered low quality. These two situations are depicted in FIGS. 1 and 2. In FIG. 1, the velocity vector angle θ is always positive, which is indicative of a high quality motion. On the other hand, in FIG. 2, the velocity vector angle θ sometimes reverses in a negative direction, which results in unacceptable motion of quality.

In many motion control systems where linear or rotary actuators are implemented, it is also desirable to have decreasing velocity toward the end stop of the actuators. Velocity near zero at the end stop would be the ideal case.

The active tilt control system is not exempt from these rules. If the actuator velocities are not decreasing towards the end stop, it is likely that the transient roll angle will overshoot. Even if the overshoot is not present, roll motion may be uncomfortable for passengers. Another result of high speed of the actuator near the end stop may be caused by violent acceleration changes when the actuator slams against the end stop. The acceleration in this case is a scaled version of the supply pressure. If the pressure transient within the actuator chambers is not smooth and has break points or discontinuities or high frequency oscillations, the actuator's elements will suffer damage much earlier in life, which reduces component reliability.

Discontinuities in actuator motion are considered break points that represent sudden change in the actuator velocity angle. This may result in the actuators speeding up at the end stop, as shown in FIGS. 3a and 3b. A comparison of the front and rear actuator motion illustrated in FIG. 3A and 3B will show that the front and rear actuators are not synchronized. Accordingly, the front actuator bottoms out first, which sends pressurized fluid into the rear actuator, thus, accelerating the rear actuator against its end stop. This is a highly undesirable situation.

Various automotive suppliers have suggested different proposals for smoothing motion of the actuator near the end stops and also reducing velocity near the end stops. Such proposals, typically, comprise numerous hydraulic accumulators or special spool valves for distributing flow between the front and rear actuators. However, these proposals result in expensive assemblies.

Accordingly, it is desirable to provide a vehicle active tilt control system in which actuator motion near the end stops is smooth, and velocity is near zero near the end stops. It is further desirable that such a system be inexpensive.

DISCLOSURE OF THE INVENTION

The present invention overcomes the above-referenced shortcomings of prior art vehicle active tilt control systems by providing a vehicle active tilt control system in which the actuators include calibrated orifices to optimize timing of the front and rear actuators, thereby smoothing motion of the actuators and reducing velocity near the end stops. In a preferred embodiment, each actuator is provided with a piston plug which at least partially restricts fluid flow through actuator outlets as the actuators approach their end stops.

More specifically, the present invention provides a vehicle active tilt control system for torsionally adjusting front and rear stabilizer bars during vehicle maneuvers. The system includes a source of pressurized fluid and a directional control valve receiving pressurized fluid from the source. Front and rear actuators each have opposing fluid chambers for receiving fluid from the directional control valve to cause actuator movement for adjusting the front and rear stabilizer bars. Each opposing fluid chamber of the rear actuator includes an inlet with a calibrated orifice therein for restricting flow therethrough to slow movement of the rear actuator for optimal timing of rear actuator movement with respect to front actuator movement.

In a preferred embodiment, each actuator includes a piston moveable between first and second fully stroked positions, and the opposing fluid chambers of the front and rear actuators include first and second fluid outlets. Each moveable piston includes first and second plugs extending therefrom for cooperation within the respective first and second outlets to at least partially restrict fluid flow through the first and second outlets as the pistons approach their respective fully stroked positions, thereby cushioning piston movement near the first and second fully stroked positions.

Accordingly, an object of the present invention is to provide a vehicle active tilt control system wherein actuator movement is smooth and slow near the end stop.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
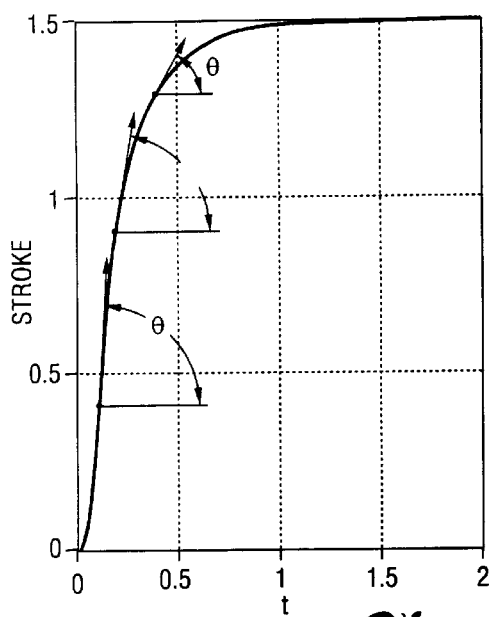
FIG. 1 shows a graphical illustration of actuator stroke vs. time for an actuator having high quality motion.
Figure 2:
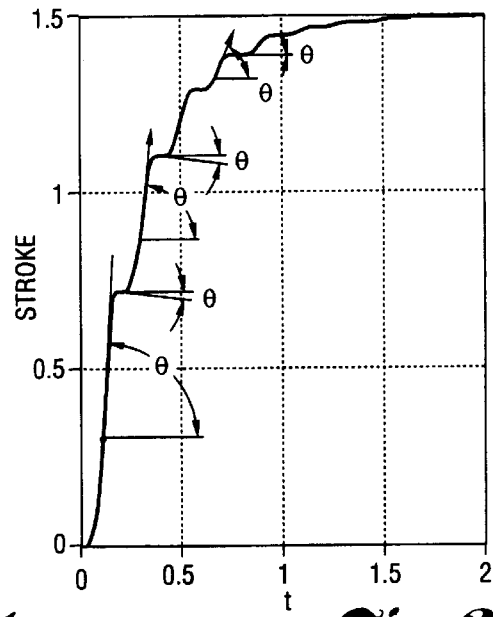
FIG. 2 shows a graphical illustration of actuator stroke vs. time for an actuator having unacceptable motion quality.
Figure 3A:
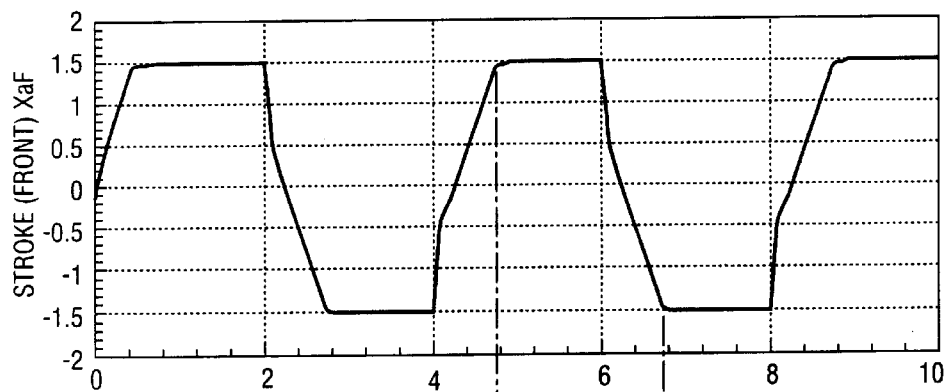
FIGS. 3a and 3b illustrate front and rear actuator motions, respectively, vs. time for a system in which the front and rear actuators are not synchronized.
Figure 3B:
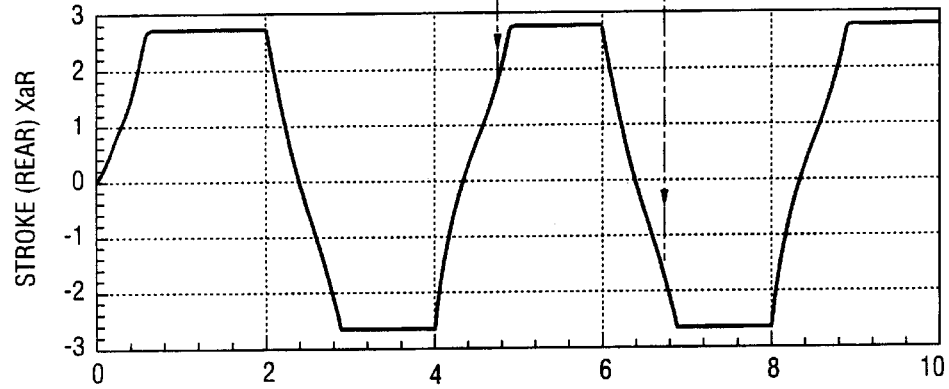
Figure 4:
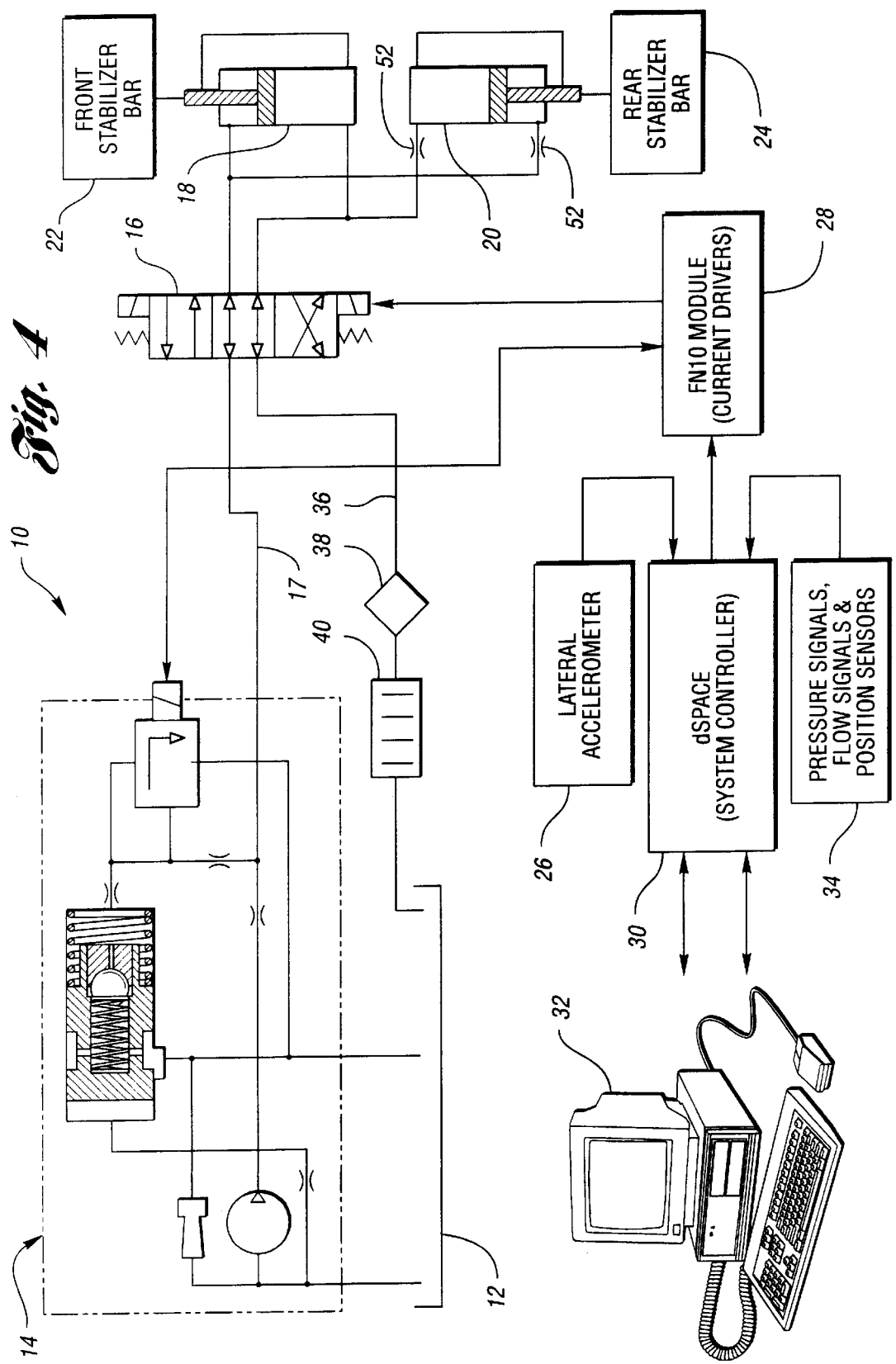
FIG. 4 shows a schematic of a vehicle active tilt control system in accordance with the present invention.

Referring to FIG. 4, a vehicle active tilt control system 10 is shown in accordance with the present invention. As shown, a hydraulic tank 12 provides hydraulic fluid which is pumped by the pump 14 to the directional control valve 16 through the main line 17.

The directional control valve 16 selectively directs the pressurized fluid to opposing chambers in the front and rear actuators 18,20 for establishing the direction of the movement of the actuators 18,20. The front and rear actuators 18,20 are connected, respectively, to the front and rear stabilizer bars 22,24 in lieu of the stabilizer bar linkages. Preferably, the front and rear actuators 18,20 are single rod end double-acting actuators. The actuators 18,20 wind up the stabilizer bars 22,24, thus, creating the desired force needed to resist body roll during vehicle maneuvers.

The vehicle active tilt control system 10 includes only a single lateral accelerometer 26 which measures the direction and magnitude of lateral acceleration during vehicle maneuvers. For purposes of testing the strategy, a particular vehicle control module 28, system controller 30, and lap top computer 32 were provided as shown in FIG. 4 for receiving the pressure, flow and position signals 34, as well as lateral accelerometer 26 signals for controlling the directional control valve 16 and for controlling the pump 14. Of course, in operation, the present invention will use an existing vehicle computer rather than the lap top computer 32 for control.

FIG. 4 also shows a fluid return circuit 36, which includes a filter 38, cooler 40, and bypass circuit 42 for returning the hydraulic fluid to the tank 12 from the actuators 18,20.

Based on lateral acceleration from the lateral accelerometer 26 and vehicle speed signals, the pump 14 and directional valve 16 are controlled. Together, these valves determine the pressure (force) and direction (extend or compress) of the actuators 18,20 for winding up the stabilizer bars 22,24.

The invention is particularly characterized by the calibrated orifices 50,52 which are placed in the inlets to the fluid chambers of the rear actuator 20 because the rear actuator 20 is typically faster than the front actuator because it has a smaller diameter and experiences lesser loads. Therefore, in order to slow the rear actuator 20, the orifices 50,52 are provided to restrict flow into the rear actuator 20.

Figure 5:
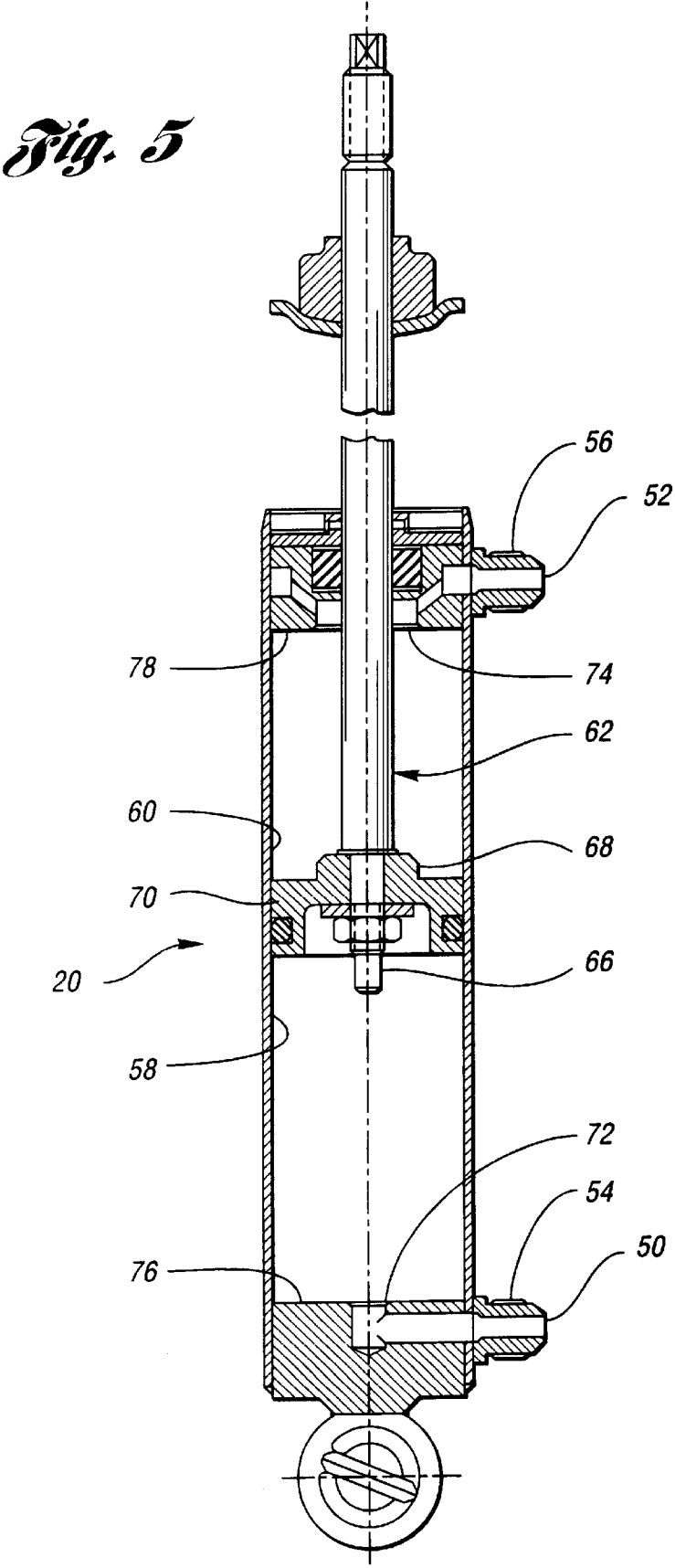
FIG. 5 shows a vertical cross-sectional view of an actuator with calibrated orifices and piston plugs in accordance with the present invention.

Turning to FIG. 5, these orifices 50,52 are easily incorporated into the actuator fittings 54,56 as shown. FIG. 5 shows the rear actuator 20 having first and second fluid chambers 58,60 with a piston 62 movable within the actuator 20 by pressurized fluid within the chambers 58,60.

Figure 6A:
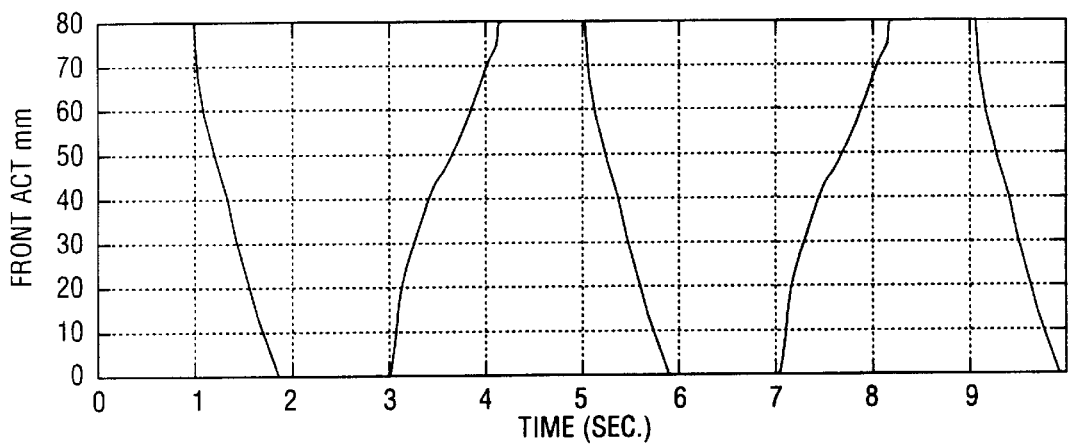
FIGS. 6a–c are graphical illustrations of front actuator motion, rear actuator motion, and pressure, respectively, vs. time for an actuator used with the present invention.
Figure 6B:
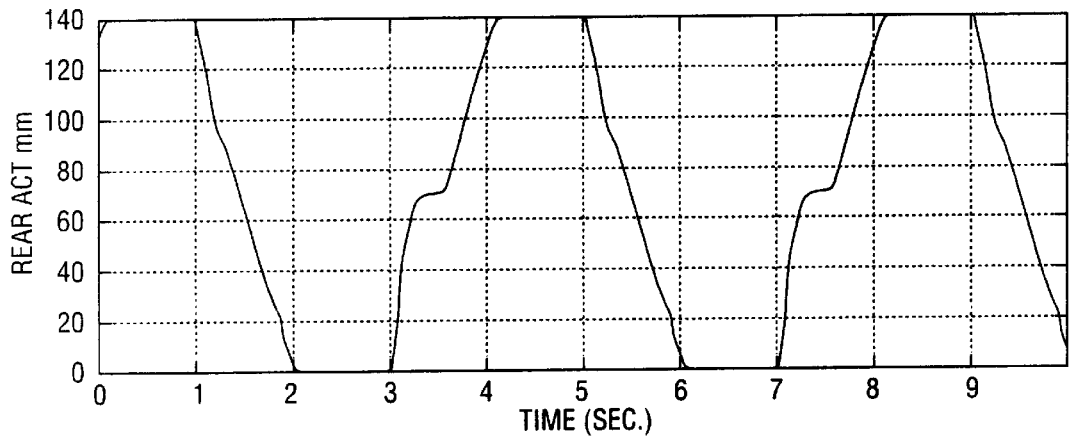
Figure 6C:
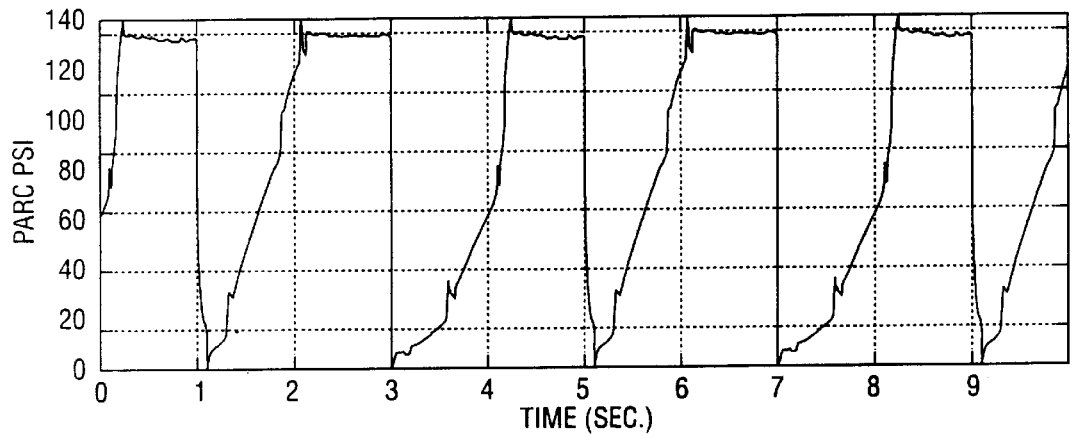
Figure 7A:
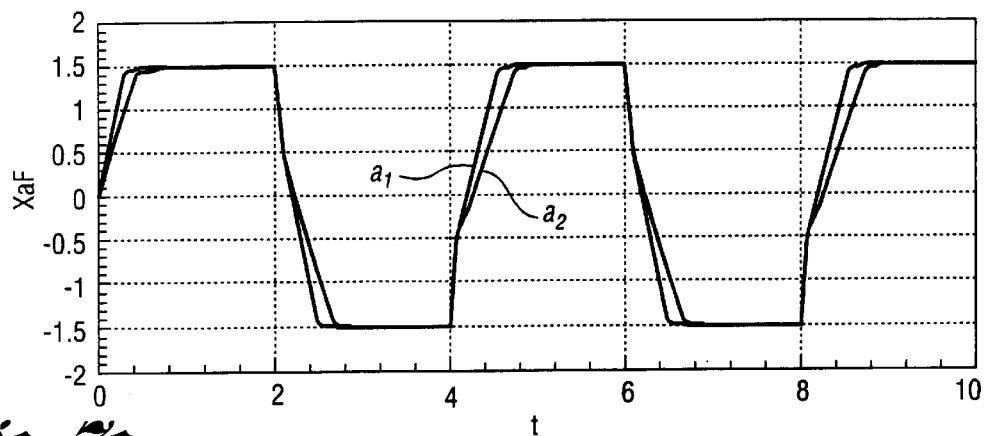
FIGS. 7a and 7b illustrate front and rear actuator motion, respectively, versus time at different engine RPMs in accordance with the present invention.
Figure 7B:
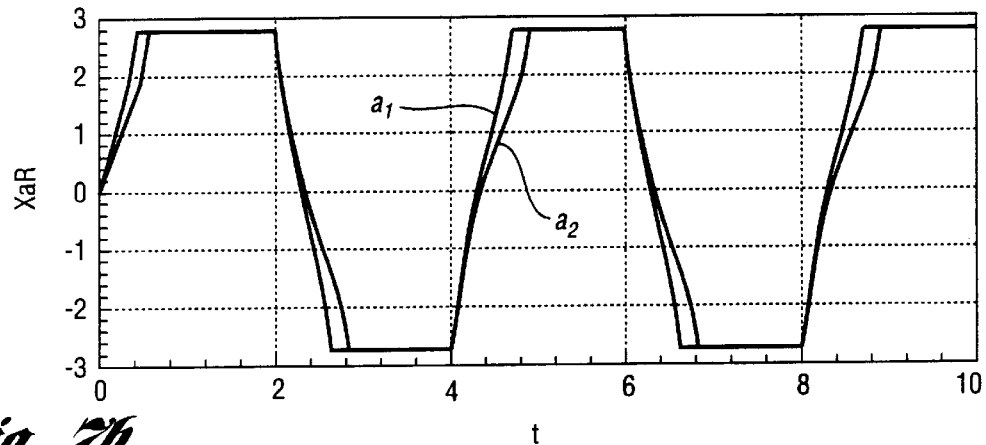

The calibrated orifices 50,52 may be used for synchronizing motion of the front and rear actuators or for rendering one actuator slower than the other as desired. For example, FIGS. 6a–c illustrate a system that was tuned to make the rear actuator slightly faster than the front actuator. FIGS. 6a–c illustrate front actuator stroke, rear actuator stroke and pressure, respectively, vs. time. Without the use of the orifices described above with reference to FIGS. 4 and 5, the rear actuator would have been much faster than the front actuator. This tuning is effective at various supply pressures, FIGS. 6a–c illustrating a system with a 1200 psi supply pressure. FIGS. 7a and 7b illustrate a system that has orifices in a rear actuator to render it slower than the front actuator. The Figure illustrates that this tuning is affective for various flow rates, wherein $A_1$ represents flow at 2000 engine rpm and $A_2$ represents flow at 700 engine rpm.

Figure 8:
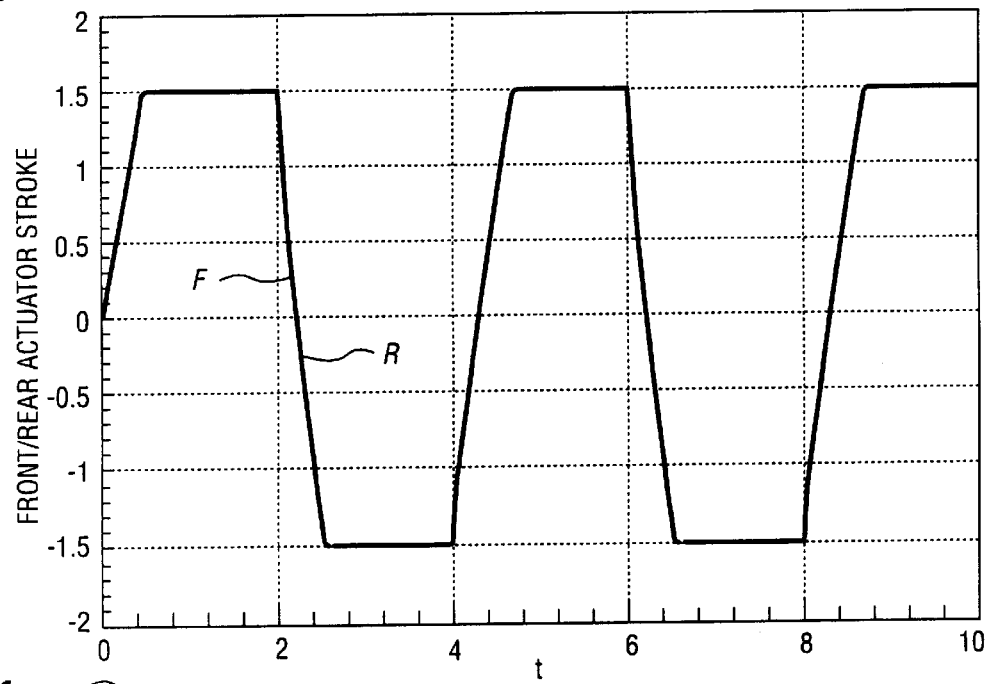
FIG. 8 shows a graphical illustration of front and rear actuator motion versus time for a synchronized system in accordance with the present invention.

As mentioned, these orifices 50,52 also provide the possibility of synchronizing the motion of both actuators for a given set of the stabilizer bars, as desired. FIG. 8 demonstrates actuator synchronization without discontinuities in motion. The front and rear actuators are in perfect synchronization, so the stroke lines F and R are overlaid and barely distinguishable from each other.

The calibrated orifices 50, 52 only take affect when fast actuator motions are occurring during vehicle evasive maneuvers. If the motion is slow, actuator position is determined by pressure and load, and they will remain synchronized. However, when the vehicle is turned quickly, the pressure is affected by flow change. A high flow demand and a high change in pressure result in a large flow changes, and any differences between front and rear actuators will be accentuated, which would result in de-synchronization of actuator motions without the calibrated orifices 50,52.

In other words, during the slow steady motion of the actuators in the quasi static case, the actuator displacement is determined by the pressure and areas of the actuators, as well as the actuator load conditions. In this case, synchronization is not needed because the actuators are not moving fast and there is no risk that the actuators will hit the end stop. The orifices 50,52 have non-linear characteristics, but this non-linearity is applied to both actuators, so when actuator velocity is high, the adjustable orifices will take affect.

A second feature of the invention relates to the design of the actuator which provides cushion at the end of travel. It is possible to use a rotary actuator and provide increased leakage at the end of travel. However, this solution decreases the actuator generated force at the end stop, which is needed at the end stop and beyond. Also, this solution is expensive.

Returning to FIG. 5, the present invention provides an actuator cushion at the end of travel by means of the first and second plugs 66,68 which extend from the base portion 70 of the moveable piston 62 for cooperation within the first and second outlets 72,74, respectively to at least partially restrict fluid flow through the first and second outlets 72,74 as the piston 62 approaches the fully stroked position, thereby cushioning piston movement near the first and second fully stroked positions. As the base 70 of the piston 62 approaches a fully stroked position, the plug 66 enters outlet 72, or alternatively, plug 68 enters outlet 74 to restrict the exit of fluid from the chambers 58,60 to cushion movement of the piston 62 near the fully stroked position. In this configuration, movement of the piston 62 is slowed near the end stops and the piston 62 is prevented from slamming against the end stops 76,78. Preferably, during travel toward the end stops 76,78, the respective plug 66,68 gradually closes the outlet of the flow. In this way, the cushion is created by entrapment of oil between the piston base 70 and the respective end stop 76,78.

These features increase the quality of active tilt control actuator motion with the common goal of improving ride quality with minimal price increase.

While the best modes for carrying out the invention have been described in detail, those familiar with the art to which this invention relates will recognize various alternative designs and embodiments for practicing the invention within the scope of the appended claims.

What is claimed is:

1. A vehicle active tilt control system for torsionally adjusting front and rear stabilizer bars during vehicle maneuvers, the system comprising:

a source of pressurized fluid;

a directional control valve receiving pressurized fluid from said source; and front and rear actuators each having opposing fluid chambers to receive fluid from the directional control valve to cause actuator movement for adjusting the front and rear stabilizer bars;

wherein each opposing fluid chamber of said front and rear actuator includes an inlet, and the in lets of the rear actuators having a calibrated orifice therein which renders the rear actuator inlets smaller than the front actuator inlets to restrict flow to the rear actuator relative to the front actuator to slow movement of the rear actuator to synchronize rear actuator movement with respect to front actuator movement during vehicle maneuvers.

2. The vehicle active tilt control system of claim 1, wherein each said actuator includes a piston movable between first and second fully stroked positions, said opposing fluid chambers of the front and rear actuators including first and second fluid outlets, and each said movable piston including first and second plugs extending therefrom for cooperation within the respective first and second outlets to at least partially restrict fluid flow through the first and second outlets as the pistons approach said fully stroked positions, thereby cushioning piston movement near the first and second fully stroked positions.

3. A vehicle active tilt control system for torsionally adjusting front and rear stabilizer bars during vehicle maneuvers, the system comprising:

a source of pressurized fluid;

a directional control valve receiving pressurized fluid from said sources; and front and rear actuators each having opposing fluid chambers for receiving fluid from the directional control valve to cause actuator movement for adjusting the front and rear stabilizers;

wherein each said actuator includes a piston movable between first and second fully stroked positions, said opposing fluid chambers of the front and rear actuators include first and second fluid outlets, and each said movable piston includes first and second plugs extending therefrom for extending into and engaging the respective first and second outlets to restrict fluid flow through the first and second outlets as the pistons approach said fully stroked positions, thereby cushioning piston movement near the first and second fully stroked positions.

4. The vehicle active tilt control system of claim 3, wherein each opposing fluid chamber of said rear actuator includes an inlet with a calibrated orifice therein for restricting flow therethrough to slow movement of the rear actuator for optimal timing of rear actuator movement with respect to front actuator movement.

5. A vehicle active tilt control system for adjusting front and rear stabilizer bars during vehicle maneuvers, the system comprising:

a source of pressurized fluid;

a directional control valve receiving pressurized fluid from said source;

front and rear actuators each having opposing fluid chambers for receiving fluid from the directional control valve to cause actuator movement for adjusting the front and rear actuators;

wherein each opposing fluid chamber of said rear actuator includes an inlet with a calibrated orifice therein for restricting flow therethrough to slow movement of the rear actuator for optimal timing of rear actuator movement with respect to front actuator movement; and wherein each said actuator includes a piston moveable between first and second fully stroked positions, said opposing fluid chambers of the front and rear actuators including first and second fluid outlets, and each said moveable piston including first and second plugs extending therefrom for extending into and engaging the respective first and second outlets to restrict fluid flow through the first and second outlets as the pistons approach said fully stroked positions, thereby cushioning piston movement near the first and second fully stroked positions.

\* \* \* \* \*